(12) United States Patent
Augustine, Jr.

(10) Patent No.: US 7,252,171 B2
(45) Date of Patent: Aug. 7, 2007

(54) CONTOURED REAR FENDER STORAGE CONTAINER FOR A MOTORCYCLE

(76) Inventor: James J. Augustine, Jr., 145 8th Ave., Pittsburgh, PA (US) 15229

( * ) Notice: Subject to any disclaimer, the term of this patent is extended or adjusted under 35 U.S.C. 154(b) by 174 days.

(21) Appl. No.: 10/988,300

(22) Filed: Nov. 12, 2004

(65) Prior Publication Data

US 2005/0098369 A1    May 12, 2005

Related U.S. Application Data

(60) Provisional application No. 60/519,242, filed on Nov. 12, 2003.

(51) Int. Cl.
*B62D 61/02* (2006.01)
*B62J 11/00* (2006.01)
*B62J 35/00* (2006.01)

(52) U.S. Cl. .................. 180/219; 280/833; 280/288.4; 244/414

(58) Field of Classification Search ............. 180/219, 180/220; 280/202, 833, 835, 288.4; 224/423, 224/413, 414
See application file for complete search history.

(56) References Cited

U.S. PATENT DOCUMENTS

| 4,258,869 A | * | 3/1981 | Hilgendorff ............. 224/429 |
| 4,726,439 A | | 2/1988 | Iwao et al. |
| 4,799,569 A | * | 1/1989 | Hattori et al. ............. 180/219 |
| 5,147,077 A | | 9/1992 | Nakajima et al. |
| 5,664,715 A | | 9/1997 | Gogan et al. |
| 5,810,227 A | * | 9/1998 | Jorgensen ............. 224/413 |
| 6,443,344 B1 | | 9/2002 | Nicosia et al. |
| 6,484,914 B1 | | 11/2002 | Willey |
| 6,648,408 B1 | * | 11/2003 | Grove ............. 297/195.13 |
| 6,729,516 B2 | * | 5/2004 | Hanagan ............. 224/423 |
| 7,034,665 B2 | * | 4/2006 | Kojika et al. ............. 340/427 |
| 2002/0008397 A1 | * | 1/2002 | Takahashi ............. 296/37.1 |
| 2002/0121534 A1 | | 9/2002 | Hanagan |
| 2004/0094947 A1 | * | 5/2004 | Ackley ............. 280/830 |

* cited by examiner

*Primary Examiner*—Lesley D. Morris
*Assistant Examiner*—Marc A. Scharich
(74) *Attorney, Agent, or Firm*—The Webb Law Firm

(57) ABSTRACT

A storage unit mounted on the rear fender of a motorcycle, and optionally on a low step-up one-piece motorcycle seat, including a storage compartment having a front surface, a bottom surface, left and right side walls, a top surface, and a cavity defined by each of the surfaces; and an access means located on the front surface of the storage unit facing the seat of the motorcycle; where the bottom surface is elongated and arcuate in its elongated axis to conform to the configuration of the motorcycle fender and the storage unit is attached to the fender such that the bottom surface of the storage unit is in contact with a top portion of the motorcycle fender.

16 Claims, 7 Drawing Sheets

CONTOURED REAR FENDER STORAGE CONTAINER FOR A MOTORCYCLE

CROSS-REFERENCE TO RELATED APPLICATION

This application claims the benefit of priority to U.S. Provisional Application Ser. No. 60/519,242 filed Nov. 12, 2003, entitled "Fender-Mounted Container For Motorcycles," which is herein incorporated by reference in its entirety.

BACKGROUND OF THE INVENTION

1. Field of the Invention

The present invention is directed to storage units for motorcycles or other two-wheeled vehicles.

2. Description of Related Art

When traveling on motorcycles, it is often desirable to have spare clothing available and, in some instances, back-up fuel available in case of inclement weather and/or to be able to take extended trips. Thus, it is desirable to have some type of storage unit available in which to place such items.

In order to satisfy such needs, one common practice has been to sling bags, commonly referred to as saddlebags, over the sides of the motorcycle. Such saddlebags are often aesthetically unappealing and provide aerodynamic drag which can detract from the enjoyment of riding a motorcycle and/or increase fuel consumption because of the extra work required by the motor to overcome the resulting aerodynamic drag.

Others, such as disclosed in U.S. Pat. Nos. 5,664,715, 6,484,914, 5,664,715, and 6,443,344, have devised luggage racks that mount onto the rear fender of a motorcycle. However, luggage racks are undesirable because the contents thereon are exposed to the weather and are otherwise not protected from the elements and debris that may come in contact with the contents on the luggage rack while traveling.

U.S. Pat. No. 6,729,516 B2 to Hanagan discloses a storage unit for a motorcycle that can be removably mounted onto the rear fender. However, the design of the storage unit is such that if eddy currents or updrafts of sufficient force come in contact with the storage unit, the storage unit may become dislodged from the fender and/or the cover may become disengaged, exposing the contents to the elements and/or causing them to be expelled from the storage unit.

U.S. Pat. No. 4,726,439 to Iwao et al. discloses trunk structures in scooter-type vehicles. However, this type of structure can only be used in that type of a large-bodied two-wheeled vehicle, and is not appropriate for the sleek, aerodynamic aesthetics desired with a motorcycle.

U.S. Pat. No. 5,147,077 to Nakajima et al. discloses a storage box for a motorcycle where the storage box is located above the engine; in other words, in between the seat and, therefore, the driver of the motorcycle and the handlebars of the motorcycle. This design has the potential of making the motorcycle difficult to drive and, in some cases, dangerous, whereby the operator cannot react quickly to hazards with which he may come in contact.

Therefore, there remains in the art a need for an aerodynamically-sound mounted storage unit for a motorcycle.

SUMMARY OF THE INVENTION

The present invention is directed to a storage unit mounted on the rear fender of a motorcycle including a storage compartment having a front surface, a bottom surface, left and right side walls, a top surface, and a cavity defined by each of the surfaces; and
   an access means located within the front surface of the storage compartment facing the seat of the motorcycle;
   wherein the bottom surface is elongated and arcuate to conform to the configuration of the motorcycle fender, and the storage compartment is attached to the fender such that the bottom surface of the storage compartment is in contact with a top section of the motorcycle fender.

The present invention is also directed to a storage unit mounted on a low step-up one-piece motorcycle seat, having a top side, including:
   a storage compartment having a front surface, a bottom surface, left and right side walls, a top surface, and a cavity defined by each of the surfaces; and
   an access means located within the front surface of the storage compartment facing the motorcycle seat;
   wherein the bottom surface is elongated and arcuate to conform to the configuration of the motorcycle seat and a rear fender, and the storage compartment is attached to the fender such that the bottom surface of the storage unit is in contact with a top portion of the fender.

The present invention is further directed to motorcycles containing the above-described storage units.

DETAILED DESCRIPTION OF THE INVENTION

The present invention is directed to a storage unit, having a storage compartment, in many cases contoured to the shape of the rear fender of a motorcycle. In certain instances, a contoured gasoline storage unit can be attached independently of the storage compartment in the means described to attach the storage compartment.

As used herein, the term "closure" refers to devices and methods used to close off or prevent further access to the internal cavities and/or compartments in the present storage unit. Suitable closures that can be used in the invention include, but are not limited to, latching doorways, pivotally mounted locking and/or latching door or hatchways, a material having complimentary parts which adhere to each other when pressed together, buttons, zippers, snaps, grommets, and combinations thereof.

In the present invention, at least a portion of the storage unit is desirably attached to the rear fender of a motorcycle. As such, the storage unit can be attached to the fender by way of a fastener (non-limiting examples including screws and rivets), hooks, braces, sleeves and/or straps.

The storage unit of the invention can be constructed of any suitable material. Suitable materials include, but are not limited to, plastics, metals, canvas, leather, and combinations thereof. Suitable plastics include, but are not limited to, polyesters, polyethylene terephthalate, polyurethanes, polycarbonates and combinations thereof. Suitable metals include, but are not limited to, steel, stainless steel, aluminum, and alloys and amalgams of such.

In an embodiment of the invention, the storage unit is adapted to contain gasoline or other fuels or oils. Further to this embodiment, the contoured gasoline storage unit can be molded to conform to the rear fender of a motorcycle. The storage unit can be constructed of plastic or metal, and can be painted to match the paint color of the motorcycle. In this embodiment, the contoured gas storage unit can contain a gas cap located at the top of the front surface of the storage compartment and can also contain a vent appropriately located on the gas storage compartment. Further to this embodiment, a fuel line can be connected to the bottom surface of the gas container and extend to the fuel line that enters the motor of the motorcycle or, alternatively, to the main fuel tank on the motorcycle.

Figure 1:
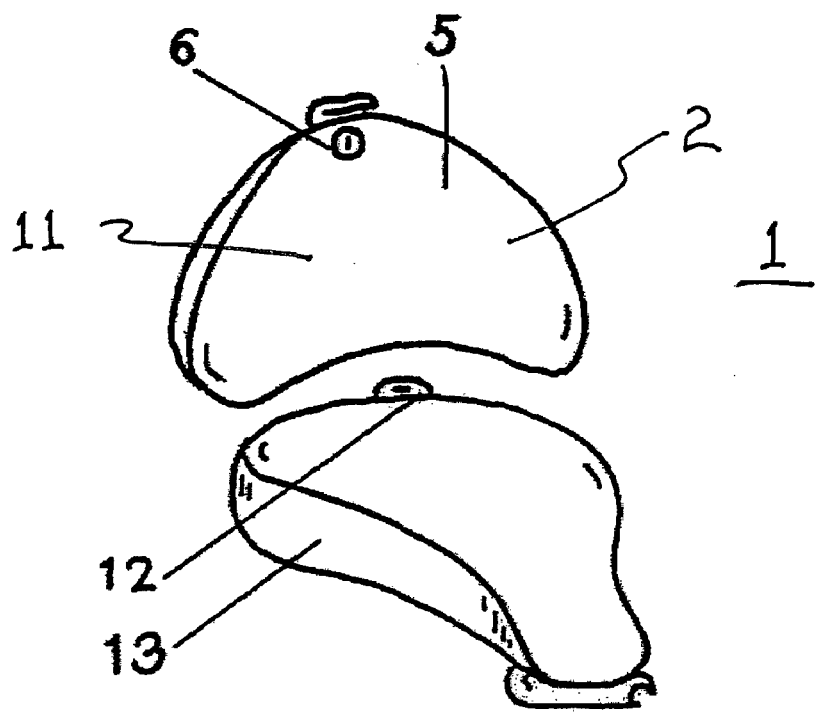
FIG. 1 shows a perspective view of a motorcycle seat and the front surface of the storage unit of the present invention.

In another embodiment of the present invention, the storage unit can be used for stowing away articles, non-limiting examples being articles of clothing. In this embodiment, a door or hatchway is pivotally mounted within the front surface of the storage compartment so that access is available to the cavity located therein. As indicated in FIG. 1, the storage unit 1 has a storage compartment 2, wherein the front surface of the storage compartment can be a padded backrest 5, which acts as a door or hatchway 11 and can be hinged so that it can open, and can include a locking device 6 to secure the opening when not in use. An advantage of the present invention is that when the operator is riding the motorcycle, the rider's back will be against the opening (hinged padded backrest 5), thus preventing the possibility of accidental opening, exposing the contents of the cavity to the environment.

Figure 2:
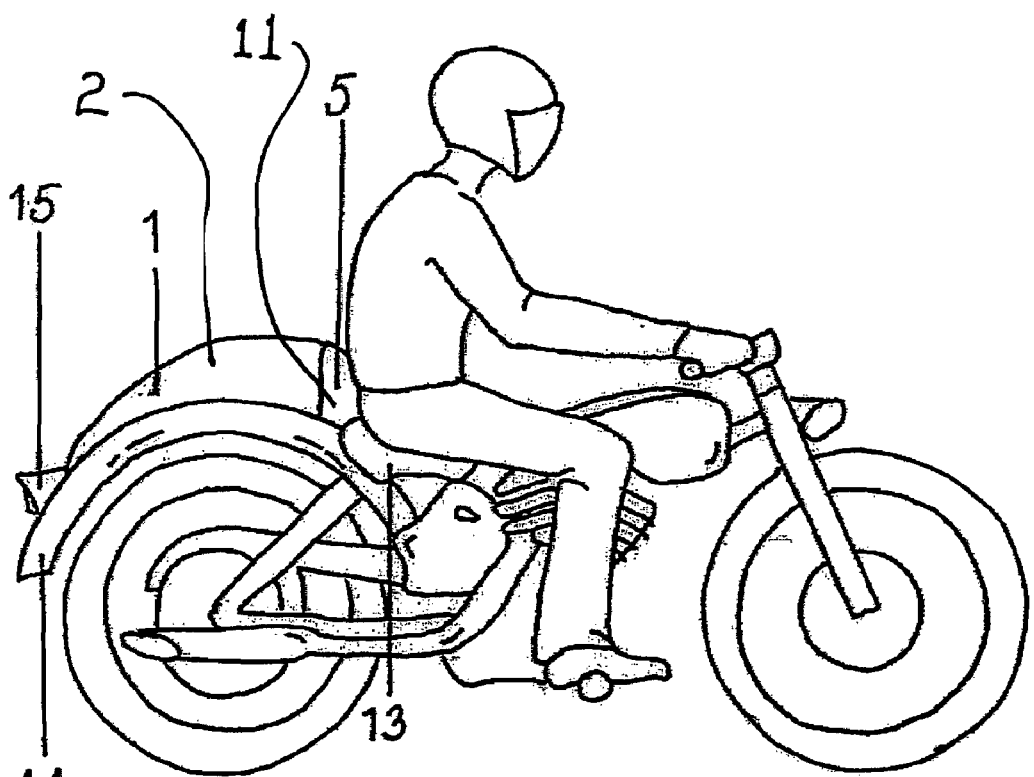
FIG. 2 shows a perspective view of a motorcycle, with a motorcycle operator, containing the storage unit of the present invention.

As shown in FIG. 2, the operator's back will typically rest against padded backrest 5 of storage unit 1. The storage compartment 2 is attached to a top surface of motorcycle fender 14. In an embodiment of the invention, the storage compartment 2 is contoured to fit around the existing rear brake light 15 on motorcycle fender 14.

In another embodiment of the invention, storage unit 1 can be configured to mount on top of a low step-up one-piece motorcycle seat. In this embodiment, the bottom of storage compartment 2 is positioned on top of the seat. Optionally, elastic material can be sewn onto the sides of storage unit 1 to enable it to slide under the one-piece motorcycle seat to secure it.

More specifically to this embodiment, a storage unit is mounted on a low step-up one-piece motorcycle seat, having a top section, that includes a storage compartment having a front surface, a bottom surface, left and right side walls, a top surface, and a cavity defined by each of the surfaces; and an access means located on the front surface of the storage compartment facing the motorcycle seat; wherein the bottom surface is elongated and arcuate in its elongated axis to conform to the configuration of the motorcycle seat and a rear fender and the storage compartment is attached to the fender such that the bottom surface of the storage compartment is in contact with a top portion of the fender.

Figure 3:
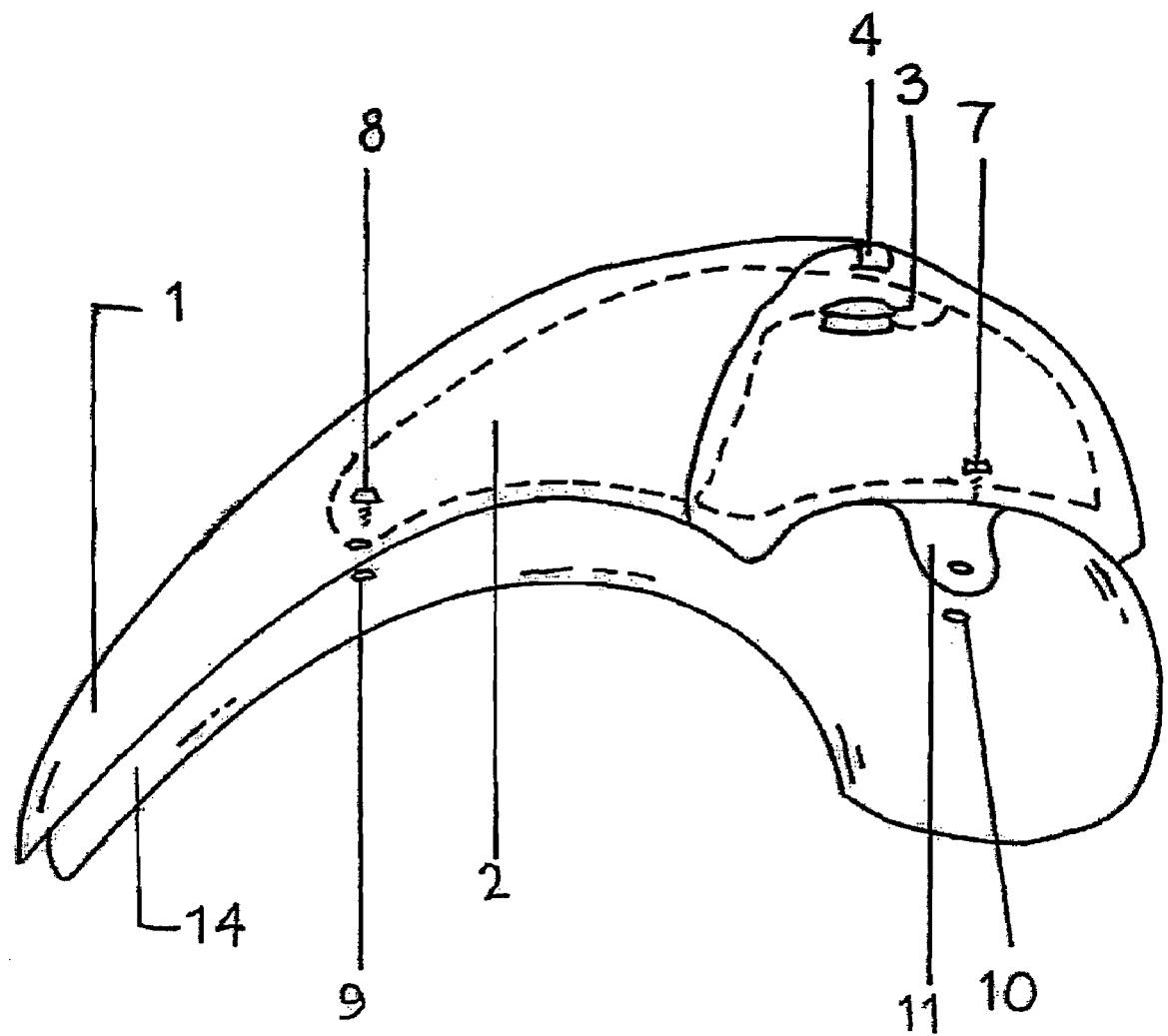
FIG. 3 shows a perspective view of the storage unit of the present invention mounted onto a motorcycle fender.

FIG. 3 shows the storage unit 1 mounted on motorcycle fender 14. As shown, the bottom surface of storage compartment 2 is contoured to fit along the top portion of motorcycle fender 14. The storage compartment 2 can be attached to motorcycle fender 14 by means of fasteners, such as screws 7 and 8 which can be threadably attached to holes 9 and 10 in motorcycle fender 14 and/or to mounting bracket 12 on seat 13 (shown in FIG. 1). In an embodiment of the invention, locking device 6 (shown in FIG. 1) interacts with latch 4 to securely close the entrance to the cavity in storage compartment 2.

Figure 7:
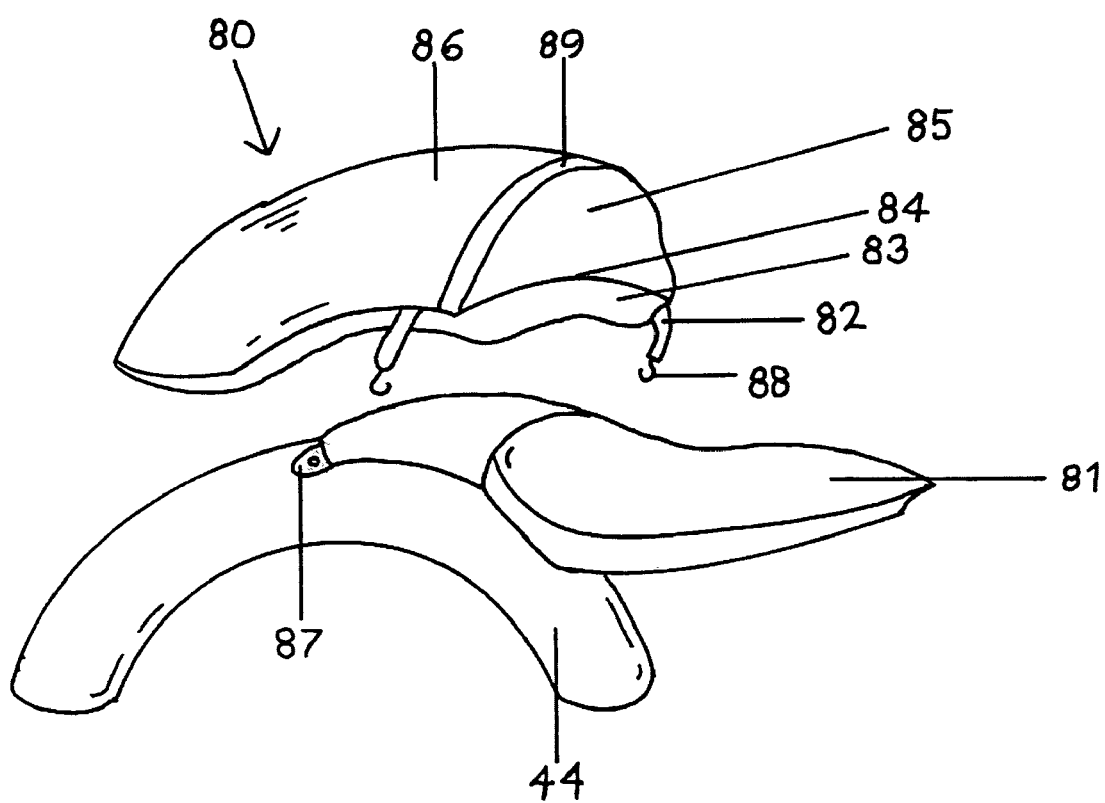
FIG. 7 shows a perspective view of a spring-loaded storage unit according to the invention.

FIG. 7 shows another embodiment of the invention. A spring mounted storage unit 80 includes a storage compartment 86, backrest 85, which can be padded, bottom surface 84, elastic slip cover 83, closure 89 (as described above), and elastic or spring-loaded tie down 82. In this embodiment, seat 81 is attached to rear fender 44 by way of fastener 87. The storage compartment 86 is attached to fender 44 by securing hooks 88 under an edge of fender 44. Although two tie downs 82 with hooks 88 are shown, any suitable number can be used. As non-limiting examples, the storage compartment 86 can have from 2 to 10, in some cases from 4 to 8, and in other cases from 4 to 6 tie downs 82 with hooks 88. In an embodiment of the invention, tie downs 82 with hooks 88 can be replaced with straps or hooks 88 that can attach to other hooks 88 to secure spring mounted storage compartment 86 to fender 44.

Figure 8:
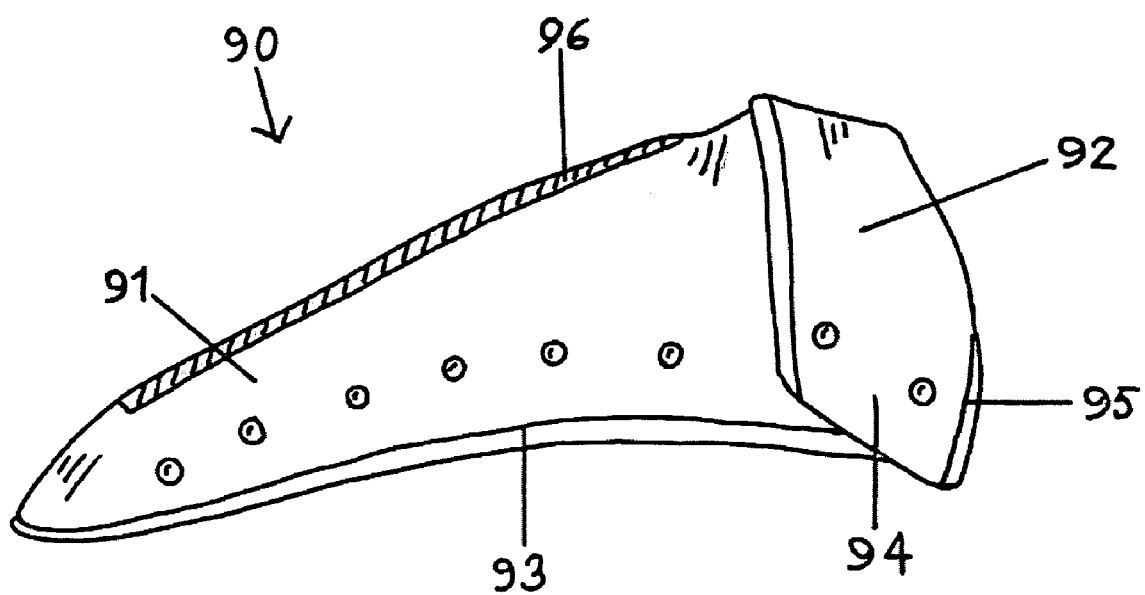
FIG. 8 shows a perspective view of a storage unit according to the invention.

FIG. 8 shows an embodiment of the invention where one-piece storage unit 90 includes one-piece compartment 91 and cover flap 92. The body of one-piece compartment 91 consists of a single piece of material (materials of construction as indicated above) where the ends are attached to each other by way of closure 93 (suitable closures detailed above). Flap 92 is constructed of the same material as compartment 91 and is secured by closure 94. Optionally, one-piece storage unit 90 can include a closure 96, shown as a zipper, however any of the closures detailed above can be used, placed along a top surface of one-piece compartment 91. Closure 96 can provide alternative access to the inside of one-piece compartment 91. As another optional embodiment, stitching 95 can be placed along the edges of one-piece compartment 91 in order to make the edges more aesthetically pleasing and durable.

In an embodiment of the invention, the storage compartment can be contoured to the shape of the rear fender of a motorcycle. In this case, the storage compartment is constructed to take the shape of a typical passenger pad or pillion pad. In some cases, a separate fuel container according to the invention can also be installed on the fender.

In an alternative embodiment, the front surface of storage compartment 2 can have an access opening and a cap 3 (FIG. 3) for sealing the opening located near the top of storage compartment 2, allowing for the filling of storage unit 1 with gasoline or another fuel, or with oil and the like.

Figure 5:
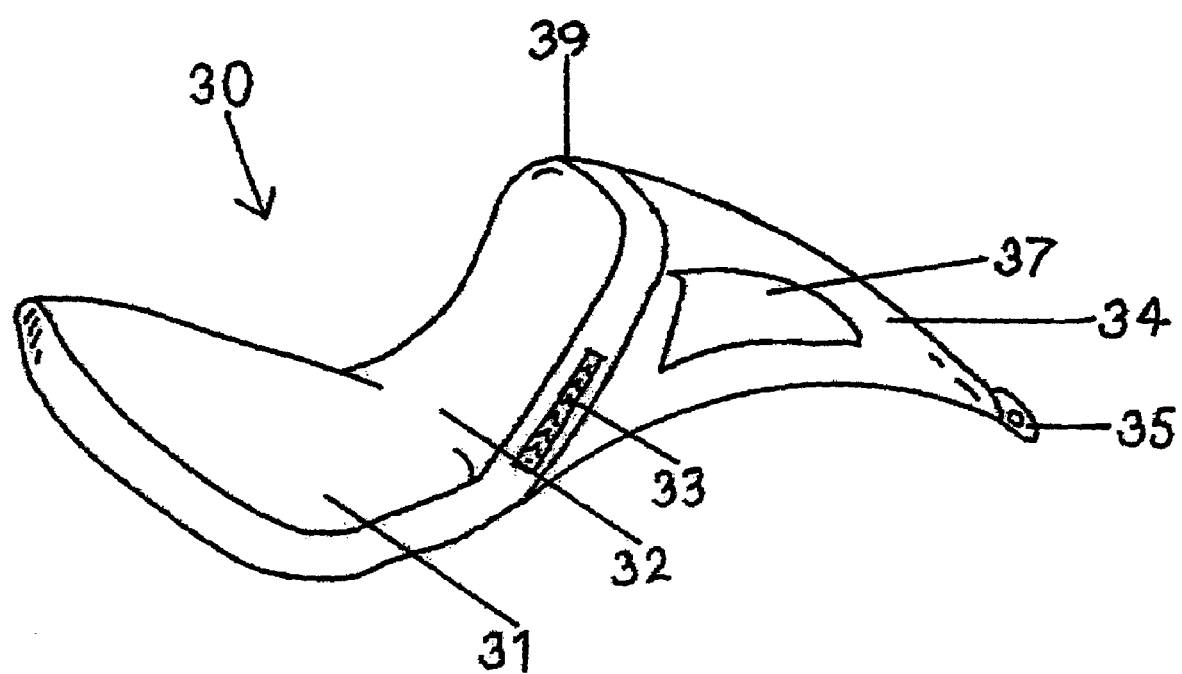
FIG. 5 shows a perspective view of a one-piece storage unit with gas can or bladder bag according to the invention.

In an alternative embodiment as shown in FIG. 5, one-piece storage compartment 30 includes seat portion 31 and backrest portion 32, which typically encase a suitable foam for riding comfort. Any suitable foam can be used in seat 31 and backrest 32, a non-limiting example being TEMPUR-PEDIC® Foam, available from Dan-Foam APS, Aarup, Denmark. Access to the storage compartment 30 is provided by access flap and closure 33, which can be secured by known suitable closure means. Suitable closure means include, but are not limited to, buttons, zippers, snaps, VELCRO® (a material having complimentary parts which adhere to each other when pressed together and adapted for use as a closure, fastener or button, Velcro S.A. Corp., Grisons, Switzerland), grommets, and combinations thereof. The flap and closure means prevent the elements from entering into the storage compartment 30 when the motorcycle is in use. The flap and closure 33 desirably traverse the length of edge 39 of backrest 32. Alternatively, flap and closure 33 can be placed in the middle of backrest 32, traversing from a point near seat 31 to near the top of backrest 32. In an embodiment of the invention, a portion of the storage compartment 30 can contain foam as in seat 31 and backrest 32 so as to also function as a second seating area for the motorcycle and/or as insulation for storage compartment 30. In an embodiment of the invention, storage compartment 30 can contain a fuel container 37, which can be contoured to accommodate storage compartment 30 also functioning as a second seat. The one-piece storage compartment 30 can be secured to a motorcycle fender by way of bracket 35, where a screw, rivet or other method of attachment known in the art can be used.

In an embodiment of the one-piece storage compartment 30 in FIG. 5, the storage compartment 30 can be constructed as a one-piece seat with additional padding for a second rider as described above. Backrest 32 can fold down, or be constructed as one constant piece. In the instance where backrest 32 is one constant piece, flap and closure 33 (as described above) can be used to gain access to storage compartment 30. Storage compartment 30 can be used to contain, without limitation, a bladderbag, cellular phone, articles of clothing, fuel container 37 and/or tools.

The dimensions of the cavity in storage compartment 2 can be described as follows. The front surface of storage compartment 2 generally has a height which extends from a center point of the front surface that is in contact with the fender to a top of the front surface generally located where locking device latch 4 is indicated in FIG. 3. The height from the motorcycle fender 14 to locking device latch 4 can be up to 16 inches, in some cases up to 14 inches and in other cases up to 12 inches. Also, the height of the front surface of storage compartment 2 can be at least 2 inches, in some cases at least 4 inches and in other cases at least 6 inches. The height of the front surface of storage compartment 2 can be any of the values recited above, or can range between any of the values recited above.

The general contour of storage compartment 2 is such that it comes to a point near locking device latch 4 and then the left side and the right side taper to the edges of motorcycle fender 14. As such, storage compartment 2 typically is at its widest point just as it comes in contact with the top surface of motorcycle fender 14. The width of storage compartment 2 at this widest point at the front surface of storage compartment 2 is typically not more than 24 inches, in some cases not more than 22 inches and in other cases not more than 20 inches. Also, the width at the front surface of storage compartment 2 can be at least 4 inches, in some cases at least 6 inches and in other cases at least 8 inches. The width of storage compartment 2 at the front surface will typically coincide with the width of motorcycle fender 14, and can be any of the values recited above or range between any of the values recited above.

The volume of the cavity in storage compartment 2, as previously recited, is defined by the bottom surface, front surface, left and right sides, and top surface of the storage compartment. In an embodiment of the invention, the height from motorcycle fender 14 to the top surface of the storage compartment gradually decreases, being at its highest point where locking device latch 4 is indicated, until the top surface of storage compartment 2 meets the bottom surface of storage compartment 2. In an embodiment of the invention, the point at which the top surface and the bottom surface meet coincides with the bottom edge of motorcycle fender 14.

The length of the bottom surface of storage compartment 2 is defined from the point where the bottom surface meets the front surface to the point where the top surface and the bottom surface meet. The length along the fender can extend from seat 13 to the directional lights mounted on motorcycle fender 14. Alternatively, the length of the bottom surface can be up to 36 inches, in some cases up to 32 inches and in other cases up to 28 inches. Also, the length of the bottom surface will typically be at least 6 inches, in some cases at least 12 inches and in other cases at least 18 inches. The length of the bottom surface can be any value recited above or range in length between any value recited above.

The volume in the cavity in storage compartment 2 can be up to 5 gallons, in some cases up to 3 gallons and in other cases up to 2.5 gallons. Also, the volume in storage compartment 2 can be at least 1 quart, in some cases at least 0.5 gallons and in other cases at least 1 gallon. The volume in storage compartment 2 can be any of the values recited above, and can range between any of the values recited above.

In an embodiment of the invention, not shown in the figures, a gas line can extend from the point at which the top surface of storage compartment 2 meets the bottom surface of storage compartment 2. In this embodiment, the fuel line is connected to storage compartment 2 at the point described above and extends to the motor, supplying fuel to the motor. Further to this embodiment, a vent can be located on storage compartment 2 at approximately the location indicated for locking device latch 4. Alternatively, a vented gas cap can be used.

Figure 6A:
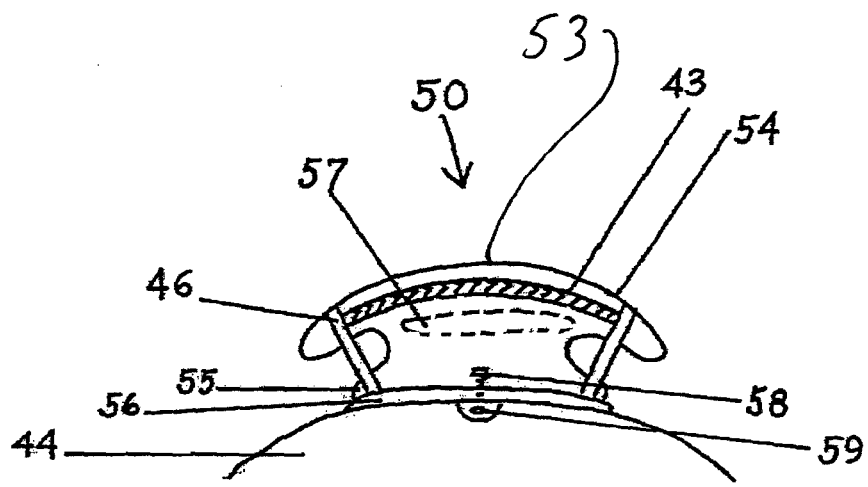
FIG. 6A shows a front elevation view of an expandable storage unit according to the invention.
Figure 6B:
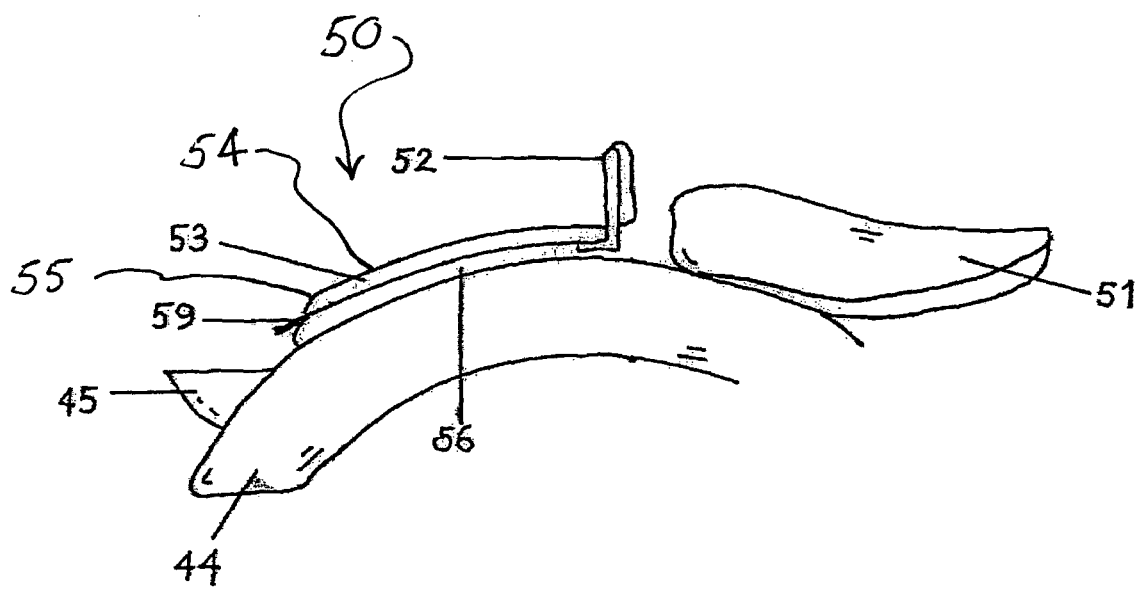
FIG. 6B shows a side elevation view of an expandable storage unit according to the invention.

In an embodiment of the invention the storage unit 50 is expanded as shown in FIG. 6B and flattened with a contoured shape to provide a stealth appearance as shown in FIG. 6A. The storage unit 50 may be expandable storage enclosure 53, which has a storage container 57, illustrated in phantom lines therein. The storage enclosure 53 has a cover 54, which can be constructed of the materials indicated above. Closure 43, which can be any of the closure means described above, provides access through the storage enclosure 53 to the storage container 57 when open and protection from the elements when closed. Storage enclosure 53 includes elastic sides 55, which allow for volume expansion for storing larger loads. Elastic bands 46 hold the storage enclosure 53 against bottom plate 56. Bottom plate 56 includes a fender bracket 59, which is used to attach the expandable storage unit 50 to a rear fender 44 of a motorcycle by way of fastener 58. In FIG. 6A, fastener 58 is a screw, however, any suitable fastening means as described above can be used.

As shown in FIG. 6B, expandable storage unit 50 can include backrest 52, which can be padded as indicated above, positioned behind seat 51. The expandable storage unit 50 can extend along fender 44 so as not to obstruct rear light 45 on fender 44.

Storage unit 1 can be constructed using any material that is compatible with its intended use. In an embodiment of the invention, storage unit 1 can be used to store articles. In such cases, storage unit 1 can be almost any durable material, non-limiting examples being plastics, metals, canvas, leather, combinations of such materials and other such materials known in the art.

In another embodiment of the invention, storage unit 1 is used to store gasoline, other fuels, and/or oil and the like. In this embodiment, storage compartment 2 is constructed of materials that will not deteriorate when exposed to gasoline, other fuels, oil, and the like, Non-limiting examples of suitable materials of construction are thermosetting plastics such as polyesters, for example, polyethylene terephthalate, polyurethanes, polycarbonates, and combinations thereof; and/or suitable metals can be used, non-limiting examples being steel, stainless steel, aluminum, and alloys and amalgams of such.

In another embodiment of the invention not shown in the figures, storage unit 1 can be removably attached to motorcycle fender 14. In this embodiment, braces can be attached to motorcycle fender 14 that allow storage compartment 2 to be securely slid into the braces coming in contact with the top surface of motorcycle fender 14 and prevent storage compartment 2 from becoming dislodged while the motorcycle is being used. As another example (not shown), magnets can be installed in the bottom of storage compartment 2, which can provide a means of attaching storage unit 1 to the metal surface of motorcycle fender 14. Alternatively, VELCRO® can be used to secure storage unit 1 to fender 14.

In an additional embodiment of the present invention, storage unit 1 is used for articles. In this embodiment, one or more hinges are placed along a bottom surface of the front surface of storage compartment 2, the hinges being attached to padded backrest 5. In this embodiment, access to the cavity in storage compartment 2 is made available by opening padded backrest 5 toward seat 13. The cavity is then closed by rotating padded backrest 5 up until locking device 6 engages with locking device latch 4.

Figure 4:
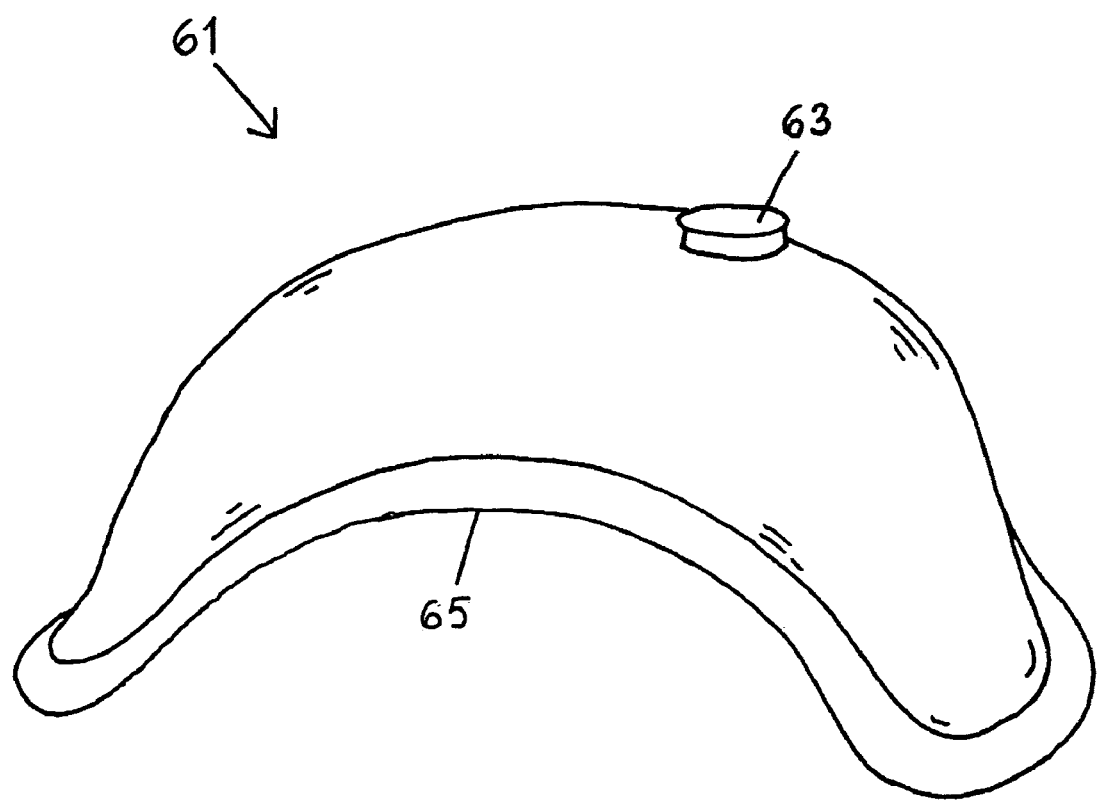
FIG. 4 shows a perspective view of a one-piece fuel/oil tank/rear fender for a motorcycle.

A particular embodiment of the invention is shown in FIG. 4. A contoured fuel/oil storage unit 61 has a bottom surface 65 that is elongated and arcuate in its elongated axis to conform to the configuration of the motorcycle rear wheel. The storage unit 61 is meant to replace a factory-installed rear fender. The storage unit 61 is equipped with cap 63, which can be vented and/or locked. The storage unit 61 can be painted and constructed of materials such as plastics, aluminum and ferrous metals. A fuel line can extend from bottom surface 65 to the engine of the motorcycle (not shown). In this manner, the storage unit 61 can serve as a structural rear fender for motorcycles in certain custom applications.

It should be understood that the present invention is not limited to the described embodiments and other changes and modifications can be made without departing from the spirit of the invention. It is therefore to be understood that within the scope of the invention, it can be practiced otherwise than is specifically described herein. It is not intended that such details be regarded as limitations upon the scope of the invention except insofar as and to the extent that they are included in the accompanying claims.

I claim:

1. A storage unit adapted to be mounted behind a seat of a motorcycle and adapted to be mounted to a top portion of a rear fender of the motorcycle, comprising:
   a storage compartment having a front surface, a bottom surface, left and right side walls, a top surface, and a cavity defined by each of the surfaces;
   an access means located within the front surface of the storage compartment facing a seat on the motorcycle; wherein the bottom surface is elongated and arcuate to conform to the configuration of the motorcycle fender and the storage compartment is attached to the fender such that the bottom surface of the storage compartment is in contact with the top portion of the motorcycle fender; and, wherein the storage compartment has an access opening and a cap for sealing said opening and is adapted to contain fuel.

2. The storage unit according to claim 1, wherein the access means comprises a door or hatchway.

3. The storage unit according to claim 2, wherein the door or hatchway includes a locking device to securely close the storage compartment.

4. The storage unit according to claim 1, wherein the access means comprises a closure.

5. The storage unit according to claim 4, wherein the closure is selected from a group consisting of a material having complimentary parts which adhere to each other when pressed together, buttons, zippers, snaps, grommets, and combinations thereof.

6. The storage unit according to claim 1, wherein the storage compartment is attached to the fender by way of a fastener, hooks, braces and/or straps.

7. The storage unit according to claim 1, wherein the storage compartment comprises a one-piece body with a single piece of material having ends, wherein the ends are attached to each other by way of closures and the access means comprises a flap secured by closures.

8. The storage unit according to claim 1, wherein the storage compartment is constructed of a material selected from a group consisting of plastics, metals, canvas, leather, and combinations thereof.

9. The storage unit according to claim 1, wherein the storage compartment has a height which extends from a center point of the front surface of the storage compartment that is in contact with the rear fender to a top of the front surface of from 2 to 16 inches, a width at its widest point of from 4 to 24 inches, and a length along the fender of from 6 to 36 inches.

10. The storage unit according to claim 1, wherein the cavity has a volume of from 1 quart to 5 gallons.

11. The storage unit according to claim 1, wherein the storage compartment is expandable and comprises elastic sides capable of providing volume expansion.

12. The storage unit according to claim 1, wherein the storage compartment is comprised of plastics selected from a group consisting of polyesters, polyethylene terephthalate, polyurethanes, polycarbonates and combinations thereof and/or a metal selected from the group consisting of steel, stainless steel, aluminum, and alloys and amalgams of such metals.

13. The storage unit according to claim 1, further comprising a fuel line extending from the storage compartment to a motorcycle engine or a main fuel tank.

14. The motorcycle according to claim 1, wherein the storage unit is mounted on the rear fender.

15. The storage unit according to claim 1, wherein the storage compartment is adapted to be removably mounted behind the seat of the motorcycle.

16. A storage unit adapted to he mounted behind a seat of a motorcycle and adapted to be mounted to a top portion of a rear fender of the motorcycle, comprising:
   a storage compartment having a front surface, a bottom surface, left and right side walls, a top surface, and a cavity defined by each of the surfaces, wherein the front surface extends above the seat to provide a backrest; and an access means located within the front surface of the storage compartment facing the seat on the motorcycle; wherein the bottom surface of the storage compartment is elongated and arcuate to conform to the configuration of the motorcycle fender and; wherein the storage compartment is attached to the rear fender such that the bottom surface of the storage compartment is in contact with the top portion of the motorcycle fender.

* * * * *

UNITED STATES PATENT AND TRADEMARK OFFICE
CERTIFICATE OF CORRECTION

PATENT NO. : 7,252,171 B2 Page 1 of 1
APPLICATION NO. : 10/988300
DATED : August 7, 2007
INVENTOR(S) : Augustine, Jr.

It is certified that error appears in the above-identified patent and that said Letters Patent is hereby corrected as shown below:

Column 8, Line 60, claim 16, "to he mounted" should read -- to be mounted --

Signed and Sealed this

Fourth Day of December, 2007

JON W. DUDAS
*Director of the United States Patent and Trademark Office*